United States Patent [19]

Young

[11] 4,050,552
[45] Sept. 27, 1977

[54] INDIVIDUAL LOAD-SENSITIVE VALE DEVICES FOR VEHICLE FLUID PRESSURE BRAKING SYSTEMS

[75] Inventor: Alastair John Young, Leamington Spa, England

[73] Assignee: Automotive Products Limited, Warwickshire, England

[21] Appl. No.: 757,154

[22] Filed: Jan. 6, 1977

[30] Foreign Application Priority Data

Jan. 27, 1976 United Kingdom .............. 02977/76

[51] Int. Cl.² .............................................. B60T 8/22
[52] U.S. Cl. .................................. 188/195; 303/6 R; 303/22 R
[58] Field of Search ..................... 303/6 R, 6 C, 22 R; 188/195, 349

[56] References Cited

U.S. PATENT DOCUMENTS

| 2,150,576 | 3/1939 | Bell | 188/195 |
|---|---|---|---|
| 3,084,002 | 4/1963 | Peras | 303/22 R |
| 3,443,843 | 5/1969 | Cadiou | 188/195 |
| 3,612,623 | 10/1971 | Chouings | 188/195 |
| 3,977,735 | 8/1976 | Bush et al. | 303/22 R |

FOREIGN PATENT DOCUMENTS 1,329,058   9/1973   United Kingdom ................ 188/195

*Primary Examiner*—Trygve M. Blix
*Assistant Examiner*—Edward R. Kazenske
*Attorney, Agent, or Firm*—Kemon & Estabrook

[57] ABSTRACT

Individual load-sensitive reducing valves for the rear wheels of a motor vehicle each have a spring connection to each rear wheel. The spring connection to the wheel whose braking is controlled by a particular valve provides an increase in biasing load on the valve which is at a high rate with respect to upward movement of that wheel relative to the vehicle body whereas the spring connection to the other wheel provides a decrease in biasing load which is at a low rate with respect to upward movement of that other wheel relative to the vehicle body. The arrangement compensates for differences between the bounce rates and roll rates of the rear suspension.

8 Claims, 4 Drawing Figures

INDIVIDUAL LOAD-SENSITIVE VALE DEVICES FOR VEHICLE FLUID PRESSURE BRAKING SYSTEMS

SUMMARY OF THE INVENTION

The invention relates to vehicle fluid pressure braking systems. It has been proposed to provide a vehicle fluid pressure braking system comprising a first valve device interposed between a driver controlled source of fluid pressure and a brake actuator for a first resiliently suspended wheel on one side of the vehicle and a second valve device interposed between the driver controlled source and a brake actuator for a second resiliently suspended wheel on the other side of the vehicle, each valve device including a plunger which is movable, by fluid pressure transmitted to the respective brake actuator, against a respective biassing load to close a valve in the valve device which prevents the fluid pressure in the respective brake actuator increasing at the same rate as the driver-controlled source when the fluid pressure transmitted to the respective brake actuator exceeds a value which is dependent on the respective biassing load, the plunger of the first valve device being connected through a spring to a suspension component of the first wheel to progressively increase the respective biassing load with upward movement of the first wheel relative to the vehicle body and the plunger of the second valve device being connected through another spring to a suspension component of the second wheel to progressively increase the respective biassing load with upward movement of the second wheel relative to the vehicle body. Such a braking system is particularly useful where said first and second wheels are the two rear wheels of a four wheel vehicle in which the static load on the rear wheels varies considerably due to differences in the load carried by the vehicle, since it operates to limit the pressure transmitted to the respective rear wheel brake actuator in response to the actual load carried by that particular wheel and thus helps to prevent rear wheel lock when the vehicle is being driven on reasonably good road surfaces.

However, on some vehicles, particularly those fitted with an anti-roll bar on the rear suspension, the deflection of the suspension for a given change in wheel load is less when the vehicle is cornering than when the vehicle is being braked or accelerated in a straight line or is having some of the load carried added to or taken off. The previously proposed braking system cannot differentiate between suspension deflections due to cornering and those due to other reasons so that the rear wheels may be overbraked or underbraked as a result.

The invention provides a vehicle fluid pressure braking system comprising a first valve device mounted on the vehicle body and interposed between a driver-controlled source of fluid pressure and a brake actuator for a first resiliently suspended wheel on one side of the vehicle, and a second valve device mounted on the vehicle body and interposed between the driver-controlled source and a brake actuator for a second resiliently suspended wheel on the other side of the vehicle, each valve device including a plunger which is movable by fluid pressure transmitted to the respective brake actuator against a biassing load to close a valve in the valve device which prevents the fluid pressure in the respective brake actuator increasing at the same rate as the driver-controlled source when the fluid pressure transmitted to the respective brake actuator exceeds a value which is dependent on the respective biassing load, wherein the plunger of the first valve device is connected through a first spring to a suspension component of the first wheel to progressively increase the respective biassing load at a high rate with respect to upward movement of the first wheel relative to the vehicle body and through a second spring to a suspension component of the second wheel to progressively decrease the respective biassing load at a low rate with respect to upward movement of the second wheel relative to the vehicle body, and the plunger of the second valve device is connected through a third spring to a suspension component of the second wheel to progressively increase the respective biassing load at a high rate with respect to upward movement of the second wheel relative to the vehicle body and through a fourth spring to a suspension component of the first wheel to progressively decrease the respective biassing load at a low rate with respect to upward movement of the first wheel relative to the vehicle body. The springs are connected so that the biassing load on the plunger of the first valve device comprises the algebraic sum of the load applied by the first spring, as multiplied by any connecting linkage, and the load applied by the second spring, as multiplied by any connecting linkage, and the biassing load on the second valve device comprises the algebraic sum of the load applied by the third spring, as multiplied by any connecting linkage, and the load applied by the fourth spring, as multiplied by any connecting linkage. A fifth spring, not connected to the vehicle suspension, may be used to supplement the biasing load applied by the first and second springs and a sixth spring, not connected to the vehicle suspension, may be used to supplement the biassing load applied by the third and fourth springs. The fifth and sixth springs may be combined as a single spring so that the direct force is applied to one plunger and the reaction force is applied to the other plunger.

Preferably the first and second wheels are the rear wheels of a four wheel vehicle and the system is symmetrical so that when the vehicle is evenly loaded about its longitudinal centre-line each of said brake actuators exerts an equal effort when the vehicle is travelling in a straight line. When both said first and said second wheels move upwards, for example due to an increase in the load on the vehicle, the increase in the biassing load on the plunger of the first valve due to the first spring is partially offset by the decrease due to the second spring. Similarly, the increase in the biassing load on the plunger of the second valve device due to the third spring is partially offset by the decrease due to the fourth spring. On the other hand, during cornering, when, for example, the first wheel moves upwards and the second wheel moves downwards, the increase in the biassing load on the plunger of the first valve device due to the first spring is supplemented by a smaller increase due to the second spring. At the same time, the decreae in the biassing load on the plunger of the second valve device due to the third spring is supplemented by a smaller decrease due to the fourth spring.

The invention will now be described by way of example and with reference to the accompanying drawings, of which:

Figure 1:
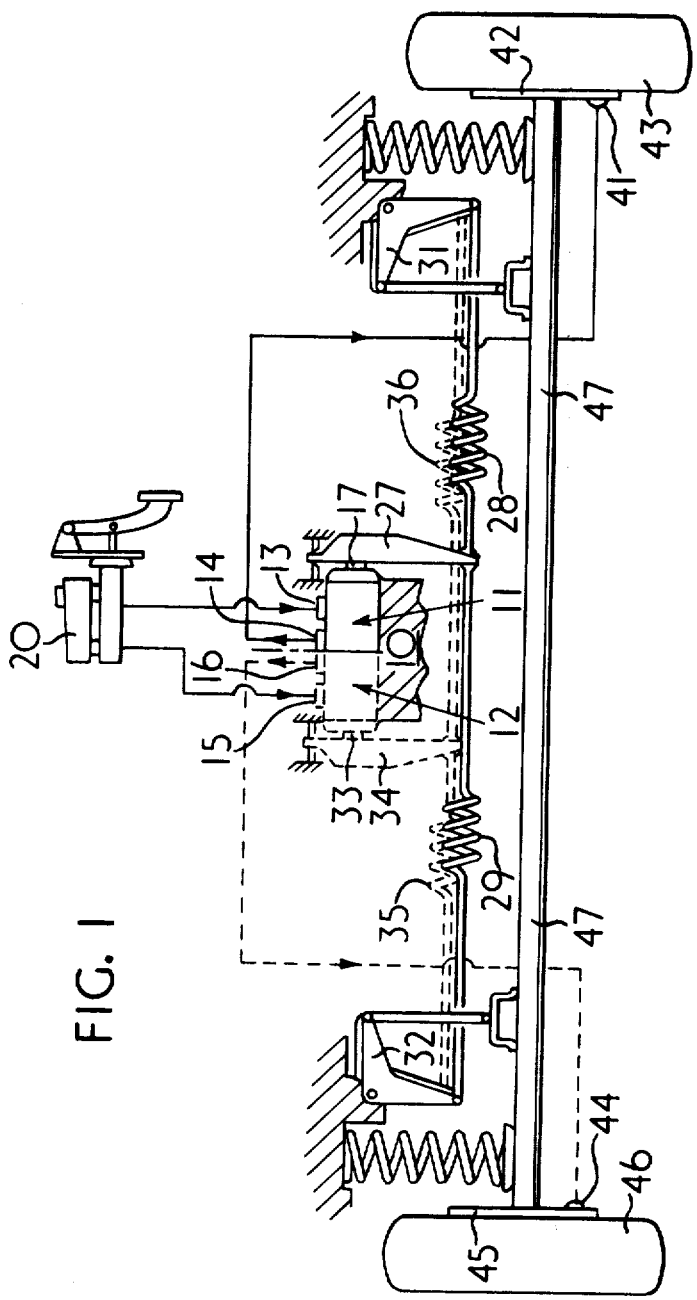
FIG. 1 is a diagrammatic view of part of a vehicle fluid pressure braking system according to the invention, components relating to one half of the system being shown chain-dotted.
Figure 2:
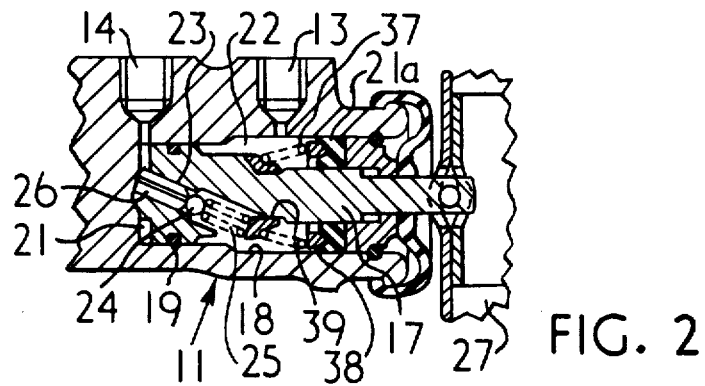
FIG. 2 is a scrap-section of a valve device shown in FIG. 1.

Referring to FIGS. 1 and 2, a vehicle fluid pressure braking system according to the invention comprises a first valve device 11 and a second valve device 12. A common casting is used for both valve devices and this is mounted on the vehicle body 10. The internal construction of each valve device 11, 12 is identical, the internal construction of the first valve device 11 being shown in detail in FIG. 2.

A port 13 in the first valve device 11 is connected to a driver controlled source of fluid pressure, in this instance a hydraulic master cylinder 20, and a port 14 is connected to a brake actuator 41 of a brake 42 acting on the right-hand rear wheel 43. The second valve device 12 has a port 15 which is also connected to the master cylinder 20 and a port 16 which is connected to a brake actuator 44 of a brake 45 acting on the left-hand rear wheel 46.

The valve device 11 comprises a stepped plunger 17 which is a sliding fit in a stepped bore 18 in the common casting. The outer diameter of an annular seal 19 in a groove in the outside diameter of the stepped plunger 17 defines one large working diameter of the plunger 17 and the inside diameter of another seal 21a which acts between the plunger 17 and the bore 18 defines a small working diameter of the plunger 17. The stepped plunger 17 divides the space within the bore 18 into a first chamber 21 and a second chamber 22, communication between the first chamber 21 and the second chamber 22 being through a stepped drilling 23 in the plunger 17. A steel ball 24, of diameter somewhat greater than the smaller diameter of the stepped drilling 23 is urged towards the step in the drilling by a light coil spring 25. This step in the drilling 23 acts as a valve seat which co-operates with the ball 24 to act as a non-return valve preventing communication from chamber 22 to chamber 21, although when the stepped plunger 17 is in a position shown in FIG. 2, i.e., in abutment with the blind end of the stepped bore 18, a pin 26 nudges the ball 24 off its seat. The pin 26 is cylindrical with four flats so that when the components are in this position there is free communication in either direction betwen chamber 21 and chamber 22.

With no pressure exerted by the master cylinder and a biassing load acting to the left on plunger 17, there is free communication from port 13 to port 14. When the driver operates the master cylinder to increase the pressure at port 13 the plunger 17 acts as a piston with an effective diameter equal to the inside diameter of seal 21a so that the plunger 17 tends to move under the action of the hydraulic pressure to the left with the biassing load from lever 27. When the hydraulic pressure at ports 13 and 14 is sufficient, the plunger 17 moves to the right, allowing the pin 26 to slide relative to the stepped drilling 23 to seat the ball 24 thus prevent further flow of hydraulic fluid from port 13 to port 14. When the ball 24 is seated, the plunger 17 acts as a piston having a large effective area, defined by the outer diameter of the seal 19, which is acted on by pressure at the outlet port 14 to bias plunger 17 towards the right and a small effective area, corresponding to the difference in the area defined by the outer diameter of seal 19 and the area defined by the inner diameter of seal 21a, acted on by pressure at port 13 to bias the plunger 17 to the left of FIG. 1. Once the ball 24 has seated a further increase in master cylinder pressure at port 13 causes the plunger 17 to move to the left to nudge the ball 24 off its seat and allow a quantity of fluid through to the chamber 21. This increases the pressure at port 14 which tends to bias the plunger 17 back towards the right and immediately reseat the ball 24, since the area acted on by pressure at port 14 is greater than the pressure acted on by pressure at the port 13. As master cylinder pressure at port 13 increases progressively, the plunger 17 moves backwards and forwards alternately seating and unseating the ball 24 so that pressure at port 14 increases at a lower rate compared with master cylinder pressure at port 13.

The pressure at which the valve device 11 starts to operate with increasing master cylinder pressure is determined by the biassing load acting on plunger 17 to bias it to the left. If the brakes are already applied and valve device 11 has started to operate and the biassing load on plunger 17 from lever 27 is reduced, the plunger 17 moves to the right to increase the volume of chamber 21 and so reduce the pressure transmitted to the brake actuator through port 14. If the biassing load from lever 27 reverses, i.e., to bias plunger 17 to the right, this reversed biassing force acts against the brake master cylinder pressure acting through port 13 on the plunger 17 to move the plunger 17 further to the right and so further decrease the pressure in chamber 21 and at the port 14.

The plunger 17 is biassed towards the left of the drawing by a lever 27 which is pivotted at one end to the vehicle body and at the other end is connected to one end of a first coil tension spring 28 and to one end of a second coil tension spring 29. The other end of spring 28 is connected to one arm of a bell-crank 31 which is pivotted on the vehicle body and has its other arm connected to a suspension component of wheel 43, namely a sprung rear axle 47, near the end which carries the wheel 43, in such a way that upward movement of the wheel 43 relative to the vehicle body causes the bell-crank 31 to pivot clockwise and decrease the tension of spring 28. The other end of the tension spring 29 is connected to a similar bell-crank 32 which is connected to the rear axle 47 near the end which carries the left-hand wheel 46 so that when the wheel 46 moves upward relative to the vehicle body the bell-crank 32 pivots anti-clockwise to decrease the tension of the tension spring 29.

The spring 28, 29 are pre-tensioned when each wheel is in its full bump position, i.e., the upward limit of its travel relative to the vehicle body, in such a way that the spring 29 has a considerably higher pre-load than the spring 28. Spring 28 however has a higher rate (i.e., increase in load per unit increase in extension) than spring 29, so that when the vehicle is in a normal standing condition the increase in tension in spring 28 caused by anti-clockwise rotation of the bell-crank 31 from its full bump position is greater than the increase in tension in the spring 29 caused by clockwise rotation of the bell-crank 32 from its full bump position. Since the preload of spring 29 is greater than that of spring 28 when the wheels are in the full bump position, the lever 27 exerts a biassing force on the stepped plunger 17 to the left of the drawings. With progressive movement of the wheels away from the full bump towards the full rebound position this biassing force progressively decreases to a value which approaches zero at the full rebound position of the wheels and which may, in certain installations, be reversed to give a slight biassing load to the right. Although springs 28 and 29 remain in tension under all suspension movements, the effect of the spring 28 having a higher rate than the spring 29 is to progressively increase the biassing load on plunger 17 at a high rate with respect to upward movement, relative to the vehicle body, of the first wheel (associated with the bell-crank 31) and the effects of the spring 29 having a low rate compared with the spring 28 is to progressively decrease the biassing load on the plunger 17 at a low rate with respect to upward vertical movement, relative to the vehicle body, of the second wheel (associated with the bell crank 32).

The second valve device 12 has a plunger 33 corresponding to the plunger 17 and this is connected to a lever 34 which corresponds to the lever 27. A third tension spring 35 connects the lever 34 to the bell-crank 32 and a fourth tension spring 36 connects the lever 34 to the bell-crank 31. The third tension spring 35 is identical to the first tension spring 28 and the fourth tension spring 36 is identical to the second tension spring 29. During setting-up, with the wheels at full bump, spring 35 is given the same pre-load as 28 and spring 36 is given the same pre-load as spring 29. Hence the system is symmetrical and for all equal movements of the first wheel and the second wheel the biassing load on plunger 33 from lever 34 acting to the right of FIG. 1 is the same as the biassing load on plunger 17 from lever 27 acting to the left of FIG. 1.

When both the rear wheels move upwards relative to the vehicle body, for example due to an increase in the load of the vehicle, the increase in the biassing load on plunger 17 due to the decrease in the tension of spring 28 is partially offset by a smaller decrease in tension on the spring 29. During cornering, when for example the right-hand wheel 43 moves upwards relative to the vehicle body and the left-hand wheel 46 moves downwards relative to the vehicle body, the increase in the biassing load on plunger 17 due to spring reducing its tension is supplemented by the smaller increase due to the spring 29 increasing its tension. This compensates for the deflection of the suspension for a given change in wheel load being less when the vehicle is cornering than when the vehicle is being braked, accelerated in a straight line or is having some of the load carried added or taken off. Because the system is symmetrical, the load changes on plunger 33 due to the changes in the tensions of springs 35 and 36 are similar to those described above for plunger 17.

Figure 3:
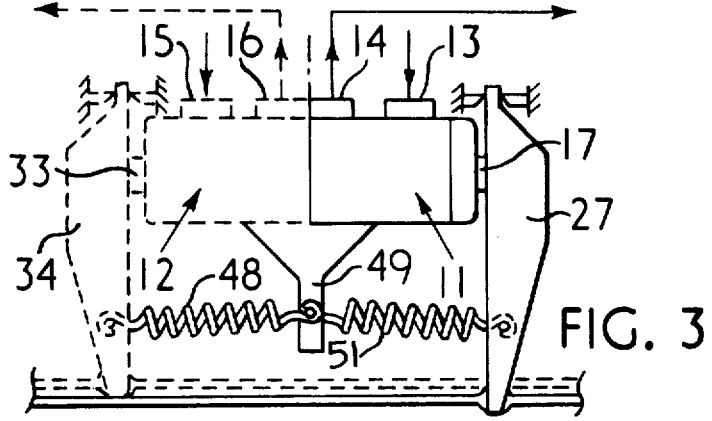
FIG. 3 is a first modification to the braking system shown in FIG. 1.

In the modification shown in FIG. 3 a fifth tension spring 51 is added to connect lever 27 to a bracket 49 so as to act to bias plunger 17 to the left and a sixth tension spring 48 connects lever 34 to the bracket 49 to bias plunger 33 to the right. The springs 48, 51 each have a substantial pre-load which reduces or obviates the need for springs 29 and 36 to have a higher pre-load than springs 28 and 35. Because the plungers 17 and 33 move comparitively little during braking and not at all during normal driving, these additional springs 48, 51 are not subject to the same fatigue cycles as the other tension srings and will thus have a much longer life. Hence if any of the four tension spring 28, 29, 35, 36 fails the additional springs 48, 51 maintain substantial biassing loads on the plungers 17, 33 and prevent loss of braking.

A light compression spring 37 in the valve device 11 acts through a ring 38 to ensure that seal 21a remains in its corner position as shown in FIG. 2 and is not displaced in transit or assembly of the braking system onto the vehicle. It also positions a ring 39 which provides an abutment for the spring 25 used to seat ball 24. The spring 37 exerts a small but relatively insignificant biassing load on the plunger 17 but it may be strengthened or supplemented by an additional spring to replace or supplement the fifth tension spring 51. The other valve device 12 would be modified in a similar way so that the spring corresponding to spring 37 would replace or supplement the tension spring 48.

Figure 4:
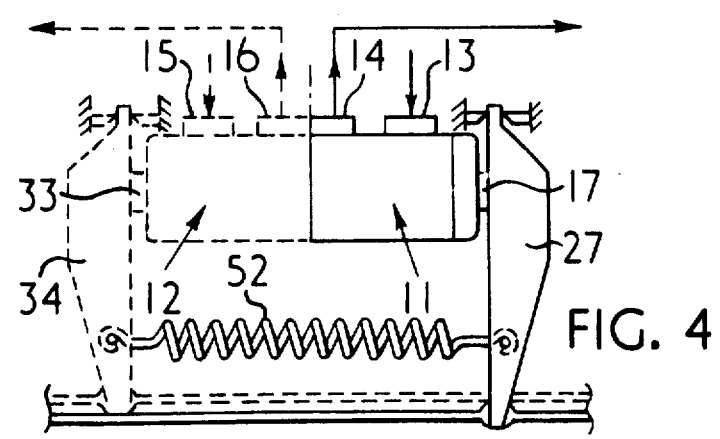
FIG. 4 shows a second modification to the braking system shown in FIG. 1.

In a second modification shown in FIG. 4 the two additional springs 48, 51 are replaced by a single additional spring 52. The load from the spring 52 acts on lever 27 to bias plunger 7 to the left and the reaction load on lever 34 acts to bias plunger 33 to the right.

I claim:

1. A vehicle fluid pressure braking system comprising:
   a driver-controlled source of fluid pressure;
   a first resiliently suspended wheel on one side of the vehicle;
   a second resiliently suspended wheel on the other side of the vehicle;
   a first brake acting on said first wheel;
   a second brake acting on said second wheel;
   a first brake actuator operative to apply said first brake;
   a second brake actuator operative to apply said second brake;
   first and second valve devices mounted on the vehicle body and interposed between the driver-controlled source and said first and second brake actuators respectively, each of said valve devices including a plunger and a valve such that the plunger is movable by fluid pressure transmitted to the respective brake actuator against a biassing load to close said valve and prevent the fluid pressure in the respective brake actuator increasing at the same rate as the driver-controlled source when the fluid pressure transmitted to the respective brake actuator exceeds a value which is dependent on said biassing load;
   a first spring operatively connected to the first wheel and to the plunger of the first valve device to progressively increase the biassing load on said plunger at a high rate with respect to upward movement of the first wheel relative to the vehicle body;
   a second spring operatively connected to the second wheel and to the plunger of the first valve device to progressively decrease the biassing load on said plunger at a low rate with respect to upward movement of the second wheel relative to the vehicle body;
   a third spring operatively connected to the second wheel and to the plunger of the second valve device to progressively increase the biassing load on said plunger at a high rate with respect to upward movement of the second wheel relative to the vehicle body;
   and a fourth spring operatively connected to the first wheel and to the plunger of the second valve device to progressively decrease the biassing load on said plunger at a low rate with respect to upward movement of the first wheel relative to the vehicle body.

2. The braking of claim 1 wherein a fifth spring, not connected to said first and second wheels, supplements the biassing load applied to the plunger of the first valve by the first and second springs and a sixth spring, not connected to said first and second wheels, supplements the biassing load applied to the plunger of the second valve by the third and fourth springs.

3. The braking system of claim 2 wherein the fifth and sixth springs are combined as a single spring.

4. The braking system of claim 3 wherein said combined spring is a tension spring.

5. The braking system of claim 2 wherein the fifth and sixth springs are tension springs.

6. The braking system of claim 2 wherein each of said fifth and sixth springs is a compression spring housed within the respective valve device.

7. The braking system of claim 1 wherein each of said first, second, third and fourth springs comprises a tension spring.

8. The braking system of claim 7 wherein the first and fourth springs are operatively connected to the first wheel by a bell-crank and the second and third springs are operatively connected to the second wheel by another bell-crank.

* * * * *